UNITED STATES PATENT OFFICE.

OSCAR GÜNTHER AND LEOPOLD HESSE, OF ELBERFELD, AND ARTHUR ZART, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

AZO DYE.

982,953. Specification of Letters Patent. Patented Jan. 31, 1911.

No Drawing. Application filed April 19, 1910. Serial No. 556,388.

*To all whom it may concern:*

Be it known that we, OSCAR GÜNTHER, LEOPOLD HESSE, and ARTHUR ZART, doctors of philosophy, chemists, citizens of the German Empire, residing, respectively, at Freyastrasse 77, Elberfeld, Boltenbergstrasse 32, Elberfeld, and Yorkstrasse 18, Vohwinkel, Germany, have invented new and useful Improvements in Azo Dyes, of which the following is a specification.

This invention relates to the preparation of new azo dyestuffs which are obtained by combining in acid solution the diazo compounds of unsulfonated nitroamins of the benzene series, especially ortho-, meta- and para-nitranilins and their derivatives *e. g.* 2-nitro-4-acetyl-para-phenylenediamin, 4-nitro-2-anisidin, 4-nitro-2-toluidin, 2-chloro-4-nitranilin, nitro-anthranilic acids, 2.6-dibromo-4-nitranilin, meta-nitro-benzidin-oxaminic acid, etc., with 2-arylamino-8-naphthol-6-sulfonic acids.

The new dyestuffs are after being dried and pulverized in the shape of their alkaline salts dark powders, yielding upon reduction with stannous chlorid and hydrochloric acid an unsulfonated benzene compound containing at least two amino groups and 1-amino-2-arylamino-8-naphthol-6-sulfonic acid. They produce on wool from an acid bath from red to black shades of good fastness to light and to milling.

In order to illustrate the new process more fully the following example is given, the parts being by weight:—138 parts of 2.4-dinitranilin are diazotized by introducing them into nitrosyl sulfuric acid prepared from 400 parts of sulfuric acid (66° Bé.) and 69 parts of sodium nitrite at 40–60° C. The resulting mixture is diluted with ice and it is then added at 0° C., to an aqueous solution which has to be stirred of 315 parts of 2-phenylamino-8-naphthol-6-sulfonic acid and 130 parts of crystallized sodium acetate. The combination is complete after a short time.

The dyestuff is isolated in the usual way and converted into the ammonium salt. It is after being dried and pulverized in the shape of its ammonium salt a dark powder soluble in concentrated sulfuric acid with a dark red color; yielding upon reduction with stannous chlorid and hydrochloric acid 1. 2. 4-triaminobenzene and 1-amino-2-phenylamino-8-naphthol-6-sulfonic acid; and dyeing wool from an acid bath a full black. Similar shades are obtained on using instead of 2-phenylamino-8-naphthol-6-sulfonic acid, other of the above mentioned derivatives of 2-amino-8-naphthol-6-sulfonic acid *e. g.* paratolyl-, xylyl-, para- or ortho-anisidyl-, meta-carboxyphenyl-2-amino-8-naphthol-6-sulfonic acid or on using instead of the above mentioned diazo compound, diazo compounds of other nitroamins.

We claim:—

1. The herein described new azo dyestuffs obtainable from the unsulfonated nitroamins of the benzene series and 2-arylamino-8-naphthol-6-sulfonic acids, which are after being dried and pulverized in the shape of their alkaline salts dark powders; yielding upon reduction with stannous chlorid and hydrochloric acid an unsulfonated benzene compound containing at least two amino-groups and an 1-amino-2-arylamino-8-naphthol-6-sulfonic acid; and dyeing wool from red to black shades, substantially as described.

2. The herein described new azo dyestuff obtainable from 2.4-dinitranilin and 2-phenylamino-8-naphthol-6-sulfonic acid, which dye is after being dried pulverized in the shape of its ammonium salt a dark powder soluble in concentrated sulfuric acid with a dark red color; yielding upon reduction with stannous chlorid and hydrochloric acid 1. 2. 4-triaminobenzene and 1-amino-2-phenylamino-8-naphthol-6-sulfonic acid; and dyeing wool black shades, substantially as described.

In testimony whereof we have hereunto set our hands in the presence of two subscribing witnesses.

OSCAR GÜNTHER. [L. S.]
LEOPOLD HESSE. [L. S.]
ARTHUR ZART. [L. S.]

Witnesses:
OTTO KÖNIG,
WILLY KLEIN.